United States Patent [19]

Catte et al.

[11] Patent Number: 5,000,659
[45] Date of Patent: Mar. 19, 1991

[54] TEMPORARY LOCKING SYSTEM FOR VARIABLY SETTABLE STATOR BLADES

[75] Inventors: Philippe P. Catte, Chennevieres; Jacky Naudet, Bondoufle, both of France

[73] Assignee: Societe Nationale d'Etude Et de Construction de Moteurs d'Aviation S.N.E.C.M.A., Paris, France

[21] Appl. No.: 533,770

[22] Filed: Jun. 6, 1990

[30] Foreign Application Priority Data

Jun. 7, 1989 [FR] France ............... 89 07515

[51] Int. Cl.$^5$ .................. F01B 25/00; F01D 17/00
[52] U.S. Cl. ...................... 415/150; 415/160; 415/190; 415/209.3; 416/212 A; 416/220 R; 403/337
[58] Field of Search .............. 415/148, 149.2, 150, 415/151, 159, 160, 163, 189, 190, 191, 208.1, 290.2, 209.3; 416/212 A; 220 R; 403/16, 337

[56] References Cited

U.S. PATENT DOCUMENTS

| | | | |
|---|---|---|---|
| 3,558,237 | 1/1971 | Wall, Jr. ............... | 415/115 |
| 3,842,595 | 10/1974 | Smith et al. ............ | 415/189 |
| 3,860,358 | 1/1975 | Cavicchi et al. ......... | 415/134 |
| 4,011,718 | 3/1977 | Asplund ................ | 415/189 |
| 4,363,600 | 12/1982 | Thebert ................ | 415/156 |
| 4,391,565 | 5/1983 | Speak .................. | 415/137 |
| 4,498,790 | 2/1985 | Fisher ................. | 384/428 |
| 4,684,320 | 8/1987 | Kunz ................... | 403/337 |

Primary Examiner—Edward K. Look
Assistant Examiner—Hoang Nguyen
Attorney, Agent, or Firm—Oblon, Spivak, McClelland, Maier & Neustadt

[57] ABSTRACT

In a turbomachine, such as a turboshaft aero-engine, having a compressor casing composed of upstream and downstream casing rings, and a variably settable stage of stator blades which is mounted in one of said casing rings near the junction therebetween so that, in normal operation, the blades have their leading (or trailing) edges projecting into the other casing ring, the setting of the blades being adjusted by a control ring surrounding the casing, there is provided a locking system for temporarily locking the blades in an angular setting in which the leading (or trailing) edges are retracted clear of said other casing when the casing is to be dismantled or assembled. The locking system comprises at least one locking member which is held captive on one of the screws securing the two casing rings together, the member being movable in the axial direction by the screw and having axially extending wings which engage in slots in the control ring to effect the locking of the stator blades when the screw is unscrewed.

9 Claims, 3 Drawing Sheets

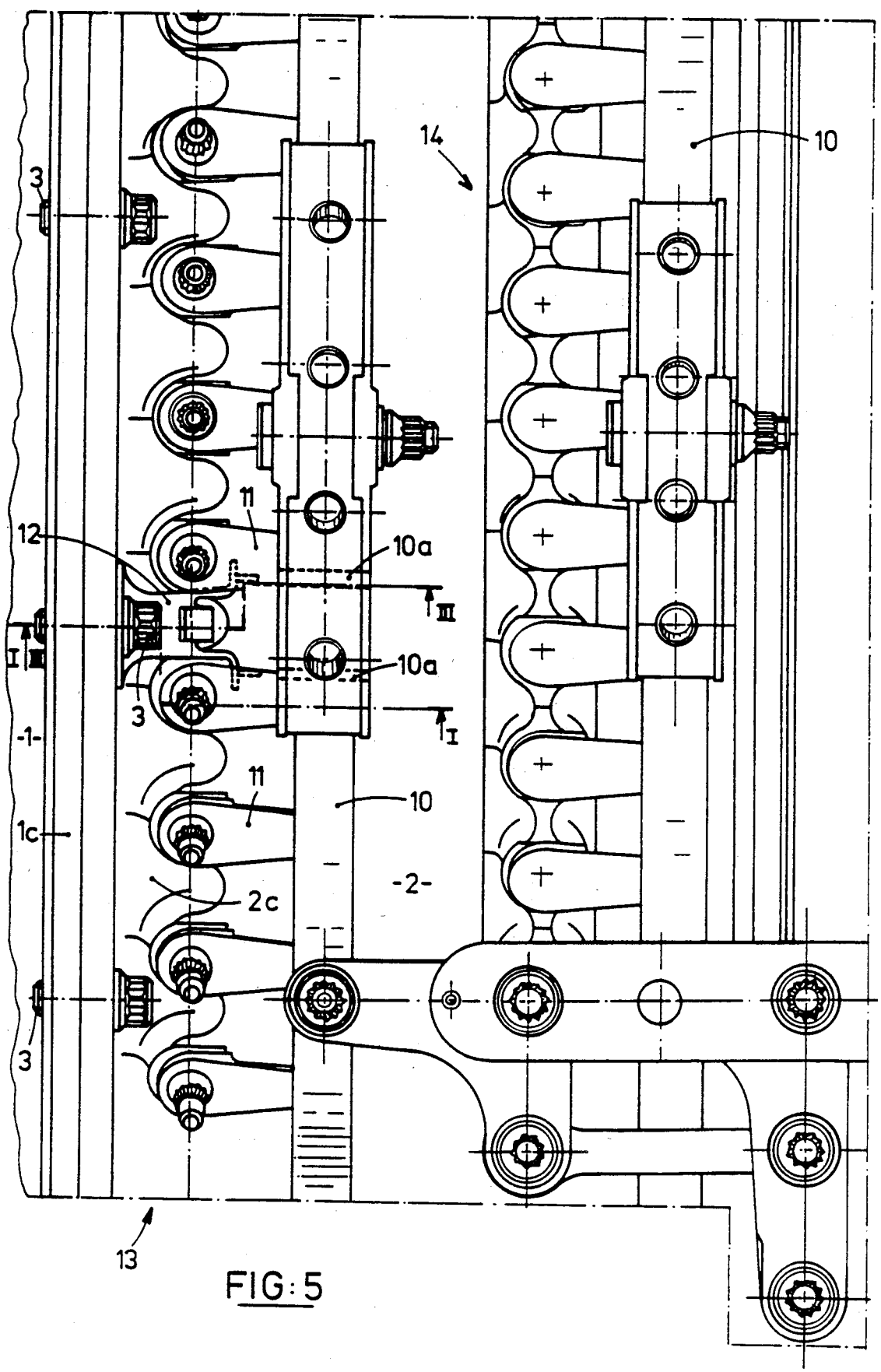
FIG:5

TEMPORARY LOCKING SYSTEM FOR VARIABLY SETTABLE STATOR BLADES

BACKGROUND OF THE INVENTION

1. Field of the Invention

The present invention relates to the assembly of turbomachine compressors, more particularly those in which the housing includes a casing formed from half shells. Compressors of this type commonly have an upstream ring of the casing formed by two half rings mounted on a downstream ring which is also formed by two half rings.

2. Summary of the Prior Art

In modern compressors of small size, but having a high compression ratio, it may happen that a stator stage is situated in the region of the joint plane separating the upstream ring from the downstream ring of the casing. Thus, a stator stage may be carried by the downstream ring and have the leading edge of its blades projecting into the upstream ring, or conversely it may be carried by the upstream ring and have the trailing edge of its blades projecting into the downstream ring. In this case it is difficult, even impossible, to dismantle radially the casing half rings which carry such stator stages.

One case where it is possible to mount and dismantle such rings is when the stator stage disposed astride the joint plane between the upstream and downstream rings is a stator stage with a variable setting, as it is then possible, during assembly or dismantling, to orientate the blades at an angle such that the leading (or trailing) edges will no longer be situated within the upstream (or downstream) ring adjacent that on which the blades are mounted.

It is an object of the present invention to provide a locking system for such arrangements whereby the blades can be temporarily locked in the assembly and dismantling setting in order to facilitate these operations.

SUMMARY OF THE INVENTION

According to the invention, there is provided a temporary locking system for a variably settable stage of stator blades in a turbomachine including a casing comprising an upstream casing ring, a downstream casing ring, and a plurality of screws securing said upstream ring to said downstream ring, said variably settable stage of stator blades being mounted in said downstream casing ring near the front edge thereof so that, in normal operation, said blades have their leading edges projecting into said upstream casing ring at the rear edge thereof, and a control ring surrounding said casing and coupled to said variably settable stage of stator blades for adjusting the angular setting of said blades, said locking system comprising at least one locking member mounted in a captive manner on a respective one of said screws securing said upstream and downstream casing rings together, said locking member being movable in a longitudinal direction by said screw and having at least one longitudinally extending wing at the downstream end of said member, said locking system further comprising at least one slot provided in said control ring at a position such that, when the angular setting of said blades is adjusted by said control ring whereby said leading edges of said blades are retracted from said upstream casing ring, said at least one slot will receive said at least one wing of said locking member to lock the control ring and said blades in position when said screw is unscrewed and said locking member is moved in the downstream direction.

The locking member may be formed by a folded sheet metal member comprising a transverse upstream tab provided with a cut out opening for receiving said screw, a transverse central tab for engagement by the head of said screw to move said locking member in the downstream direction when said screw is unscrewed, and two axial downstream wings for engagement in respective slots in said control ring.

Although the invention is defined above with reference to the case where the stator stage is mounted in the downstream casing ring and it is the leading edges of the blades that protrude into the upstream ring, it will of course be appreciated that the invention is also applicable to the case where the stage is mounted in the upstream ring and it is the trailing edges of the blades that protrude into the downstream ring. Furthermore, the invention may also be applied to the locking of components other than the stator blades, such as an adjustable casing arm controlled by an equivalent ring system.

Other features of the invention will become more apparent from the following description of a preferred embodiment of the invention with reference to the accompanying drawings.

BRIEF DESCRIPTION OF THE DRAWINGS

FIG. 3 is a view similar to that of FIG. 1, but taken in the plane III—III in FIG. 5 and showing the locking member of the locking system in engagement with the control ring of the variable settable stator blades to lock the ring, and hence the blades in position.

FIG. 5 is a top plan view of the compressor casing of a turbojet engine having a variably settable stator stage incorporating the temporary locking system illustrated in FIGS. 1 to 4.

DESCRIPTION OF THE PREFERRED EMBODIMENT

Figure 1:
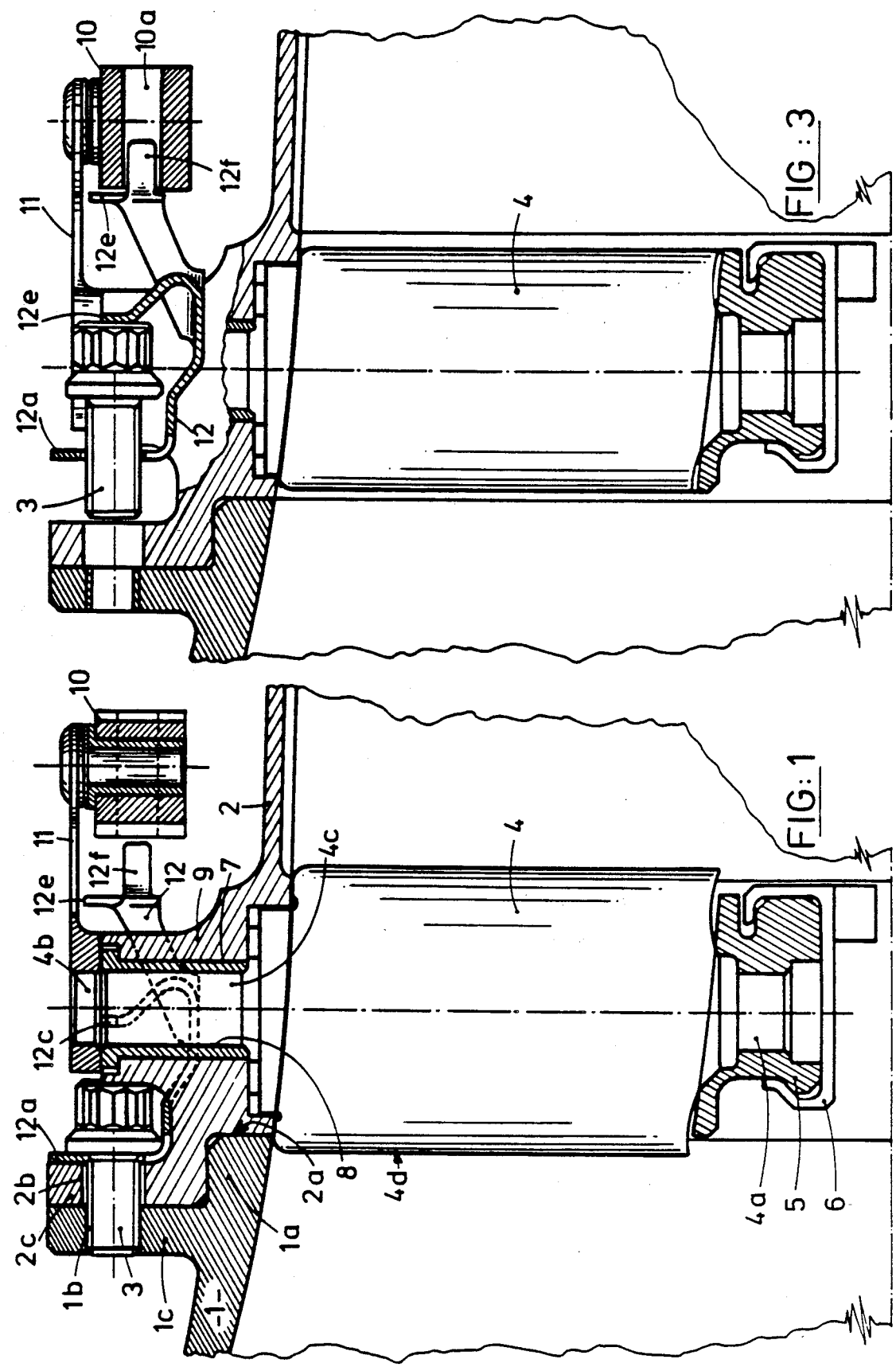
FIG. 1 is a partial longitudinal section of a compressor having a variably settable stator stage incorporating one embodiment of a temporary locking system in accordance with the invention, the section being taken in the plane I—I in FIG. 5 and showing the locking system in its unlocked state.

It will be seen from FIG. 1 that the compressor casing has an upstream half ring 1 and a downstream half ring 2. The upstream half ring has a rear edge 1a which seats in an annular rebate 2a of the downstream ring to ensure that the assembly remains circular. The two rings are held together by screws 3 inserted through holes 2b in a flange 2c of the downstream ring and screwed into internally screw threaded holes 1b in a flange 1c of the upstream ring.

The first row of blades carried by the downstream ring is a stage of variably settable stator blades 4 of which the root 4a pivots in a bush 5 of an inner ring 6 and the driving axle 4b at the head of the blade has a cylindrical bearing surface 4c pivoting in a bush 7 mounted in a bore 8 in an outer boss 9 of the downstream half ring 2. Rotation of the blades 4 is effected by a control ring 10 connected to the blades by operating links 11.

The fixing screws 3 of the rings 1 and 2 are located between the bosses in which the blades 4 pivot.

As can be seen in FIG. 1, during operation each blade 4 has its leading edge 4d projecting under the rear edge 1a of the upstream ring as a result of the stator stage being situated very close to the edge of the downstream ring 2. Thus, when the compressor is assembled or dismantled, the blades 4 must be temporarily set in an angular position where their leading edge will have turned sufficiently to be disengaged from the upstream ring, and such that the leading edges 4d will not be knocked and dented by the inner part of the upstream ring 1 when the downstream half shell 2 is removed.

Figure 2:
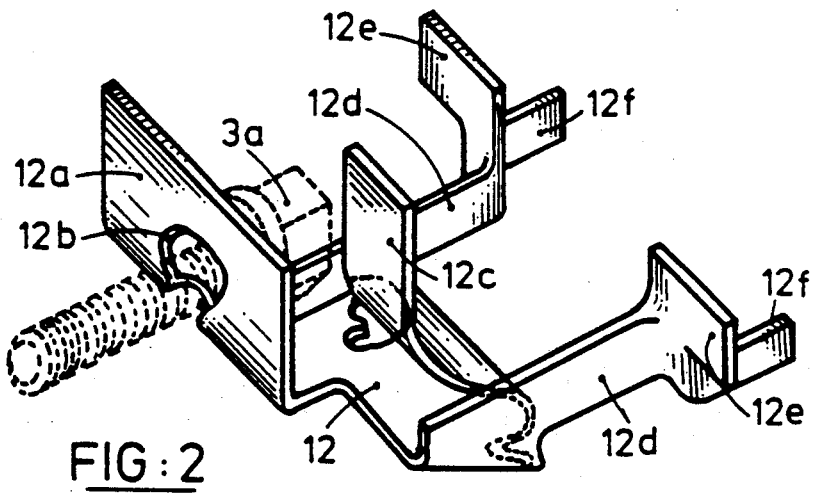
FIG. 2 is a perspective view of a locking member of the locking system indicated in FIG. 1.

In order to maintain the temporary setting during assembly or dismantling, a locking member or bolt 12 is mounted on at least one of the screws 3 used for fixing the rings together. This locking member 12 will now be described with reference to FIGS. 2 and 2a.

Figure 2A:
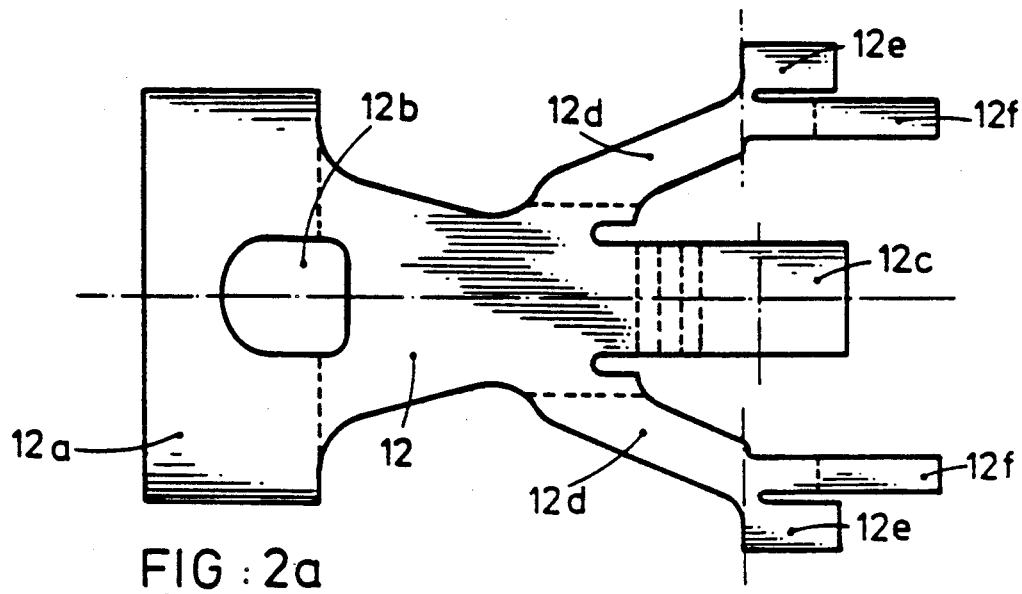
FIG. 2a is a plan view of a pressed and cut sheet metal blank before being folded to form the locking member of FIG. 2.
Figure 4:
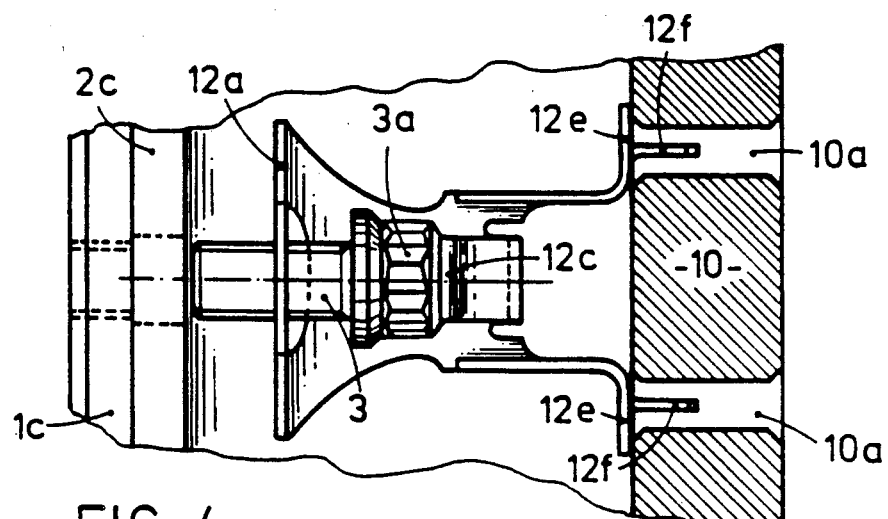
FIG. 4 is a top plan view of the locking member in its locking position shown in FIG. 3.

FIG. 2a shows a flat, pressed sheet metal blank which can be folded to form the locking member 12. In this view, the uniformly broken lines represent an upward folding of the sheet metal blank, and the uneven broken lines denote a downward folding of the blank.

The locking member 12 which is made from the sheet metal blank thus has an upstream transverse tab 12a which is folded upwards and has a cut out portion 12b sufficient for the passage of the threaded shank of one of the fixing screws 3. A rear central part 12c of the member 12 is also folded upwards to form a transverse central driving tab parallel to the upstream tab 12a. The member 12 further has two longitudinal side portions 12d which are also folded upwards and each of which has its downstream end divided into two parts, an upper part 12e folded laterally outwards to form a downstream transverse stop, and a lower part 12f folded longitudinally from the upper part 12e to form an axially extending downstream wing.

In order to install the locking member thus described, the control ring 10 of the adjustable stator blades 4 is moved to rotate the blades to a position wherein they are turned such that their leading edges do not protrude beyond the ring 2. The locking member is then placed in the gap between two adjacent bosses 9 and positioned such that its downstream wings 12f are received in slots 10a which are provided for this purpose in the control ring 10 and its downstream stops 12e abut the ring 10. A fixing screw 3 is then slid into the cut-out 12b of the locking member so that the head 3a of the screw becomes held captive between the upstream transverse tab 12a and the central tab 12c, and the screw 3 is screwed into the flange 1c. While the screw is being screwed home, the axial wings 12f of the locking member remain engaged in the slots 10a and prevent the control ring 10 from being rotated, thus maintaining the stator blades 4 in their retracted position. As the screw reaches its fully tightened position however, the wings 12f move clear of the slots 10a to release the ring 10 for movement to reset the blades for normal operation.

Removal of the downstream ring is carried out in the reverse order after once again positioning the control ring 10 so that the blades 4 are turned to their retracted position and the slots 10a are aligned with the wings 12f of the locking member 12. The screw 3 is then unscrewed, during which operation the screw head 3a engages the drive tab 12c and thereby pushes the whole of the locking member in the downstream direction so that the wings 12f move into the slots 10a of the ring to lock the ring, and hence the blades 4, in Position throughout the dismantling process.

When the screw 3 has been fully unscrewed the stops 12e abut the ring 10, indicating that the screw 3 is clear of the flange 1c of the upstream ring and that the downstream ring 2 can be removed from its seating.

The total length of the locking member is such that if the downstream wings 12f are not received in the slots 10a of the control ring 10 the fixing screw 3 cannot be removed from the flange of the casing ring which carries it.

FIG. 5 shows a top view of a compressor casing incorporating the invention and in which the downstream ring 2 carries two variably settable stator blade stages 13,14 operated by control rings 10. For each half ring of the downstream ring 2, a single locking member cooperating with notches 10a of the upstream control ring is sufficient to lock the said ring temporarily in position so that assembly and dismantling of the compressor casing can be carried out without any risk of damage to the blades.

The invention therefore provides a simple solution to the problem of assembling the compressor casing shells of modern engines in which the distances between stages are small, and also prevents any danger of damage to stator blades during maintenance operations.

We claim:

1. A temporary locking system for a variably settable stage of stator blades in a turbomachine including a casing comprising an upstream casing ring, a downstream casing ring, and a plurality of screws securing said upstream ring to said downstream ring, said variably settable stage of stator blades being mounted in said downstream casing ring near the front edge thereof so that, in normal operation, said blades have their leading edges projecting into said upstream casing ring at the rear edge thereof, and a control ring surrounding said casing and coupled to said variably settable stage of stator blades for adjusting the angular setting of said blades, said locking system comprising at least one locking member mounted in a captive manner on a respective one of said screws securing said upstream and downstream casing rings together, said locking member being movable in a longitudinal direction by said screw and having at least one longitudinally extending wing at the downstream end of said member, said locking system further comprising at least one slot provided in said control ring at position such that, when the angular setting of said blades is adjusted by said control ring whereby said leading edges of said blades are retracted from said upstream casing ring, said at least one slot will receive said at least one wing of said locking member to lock the control ring and said blades in position when said screw is unscrewed and said locking member is moved in the downstream direction.

2. A locking system according to claim 1, wherein said locking member is formed by a folded sheet metal member comprising a transverse upstream tab provided with a cut out opening for receiving said screw, a transverse central tab for engagement by the head of said screw to move said locking member in the downstream direction when said screw is unscrewed, and two axial downstream wings for engagement in respective slots in said control ring.

3. A locking system according to claim 2, wherein said central tab is formed by a central part of said sheet metal member folded radially upwards between two longitudinal edge portions of said member which are also folded radially upwards.

4. A locking system according to claim 3, wherein said two axial downstream wings are situated at the downstream ends of the two uPwardly folded longitudinal edge portions of said sheet metal member.

5. A locking system according to claim 1, wherein said locking member comprises at least one transverse stop arranged to abut said control ring when said screw is fully unscrewed and has moved said locking member into its locking position in which said at least one downstream wing is engaged in said at least one slot of said control ring.

6. A locking system according to claim 1, wherein the total length of said locking member is such that said screw cannot be removed from said casing rings if said at least one downstream wing is not received in said at least one slot of said control ring.

7. A turbo-machine including a locking system according to claim 2 and further including a casing comprising an upstream casing ring, a downstream casing ring, and a plurality of screws securing said upstream ring to said downstream ring, a variably settable stage of stator blades mounted in said downstream casing ring near the front edge thereof so that, in normal operation, said blades have their leading edges projecting into said upstream casing ring at the rear edge thereof, a control ring surrounding said casing and coupled to said variably settable stage of stator blades for adjusting the angular setting of said blades, and having said screw which carries said locking member of said locking system extending through said cutout opening in said upstream transverse tab of said locking member and having its head held captive between said upstream tab and said central tab.

8. A temporary locking system for a variably settable stage of stator blades in a turbomachine including a casing comprising an upstream casing ring, a downstream casing ring, and a plurality of screws securing said upstream ring to said downstream ring, said variably settable stage of stator blades being mounted in said upstream casing ring near the rear edge thereof so that, in normal operation, said blades have their trailing edges projecting into said downstream casing ring at the front edge thereof, and a control ring surrounding said casing and coupled to said variably settable stage of stator blades for adjusting the angular setting of said blades, said locking system comprising at least one locking member mounted in a captive manner on a respective one of said screws securing said upstream and downstream casing rings together, said locking member being movable in a longitudinal direction by said screw and having at least one longitudinally extending wing at the upstream end of said member, said locking system further comprising at least one slot provided in said control ring at a position such that, when the angular setting of said blades is adjusted by said control ring whereby said trailing edges of said blades are retracted from said downstream casing ring, said at least one slot will receive said at least one wing of said locking member to lock the control ring and said blades in position when said screw is unscrewed and said locking member is moved in the upstream direction.

9. A locking system according to claim 8, wherein said locking member is formed by a folded sheet metal member comprising a transverse downstream tab provided with a cut out opening for receiving said screw, a transverse central tab for engagement by the head of said screw to move said locking member in the uPstream direction when said screw is unscrewed, and two axial upstream wings for engagement in respective slots in said control ring.

* * * * *

UNITED STATES PATENT AND TRADEMARK OFFICE
CERTIFICATE OF CORRECTION

PATENT NO. : 5,000,659
DATED : MARCH 19, 1991
INVENTOR(S) : Philippe P. CATTE and Jacky NAUDET It is certified that error appears in the above-identified patent and that said Letters Patent is hereby corrected as shown below:

Title Page:
In the Abstract, line 12, after "casing" (first occurrence) insert --ring--.

Column 3, line 6, after "bosses" insert --9--.

Column 5, line 8, change "uPwardly" to --upwardly--.

Column 6, line 34, change "uP-" to --up---.

Signed and Sealed this

Sixth Day of October, 1992

Attest:

DOUGLAS B. COMER

*Attesting Officer*     *Acting Commissioner of Patents and Trademarks*